(12) United States Patent
Schultz et al.

(10) Patent No.: US 11,452,299 B2
(45) Date of Patent: Sep. 27, 2022

(54) PLANT BASED ALLERGEN-FREE COFFEE CREAMER OR WHITENER COMPOSITION

(71) Applicant: WhiteWave Services, Inc., Denver, CO (US)

(72) Inventors: Pamela Kyle Schultz, Denver, CO (US); Aaron Shawn Malone, Broomfield, CO (US)

(73) Assignee: WhiteWave Services, Inc., Broomfield, CO (US)

( * ) Notice: Subject to any disclaimer, the term of this patent is extended or adjusted under 35 U.S.C. 154(b) by 0 days.

(21) Appl. No.: 16/511,564

(22) Filed: Jul. 15, 2019

(65) Prior Publication Data

US 2020/0015491 A1    Jan. 16, 2020

Related U.S. Application Data

(60) Provisional application No. 62/698,466, filed on Jul. 16, 2018.

(51) Int. Cl.
    *A23C 11/10*    (2021.01)
    *A23F 5/46*     (2006.01)

(52) U.S. Cl.
    CPC .............. *A23C 11/10* (2013.01); *A23F 5/465* (2013.01)

(58) Field of Classification Search
    CPC .................................. A23C 11/10; A23F 5/465
    USPC ......................................................... 426/595
    See application file for complete search history.

(56) References Cited

U.S. PATENT DOCUMENTS

| 2011/0189372 | A1  | 8/2011 | Sher et al. |
| 2011/0189373 | A1  | 8/2011 | Beeson et al. |
| 2012/0040056 | A1* | 2/2012 | Tewnion .............. A23L 2/60 |
|              |     |        | 426/73 |
| 2020/0236981 | A1* | 7/2020 | Rousset ............. A23C 11/103 |

FOREIGN PATENT DOCUMENTS

| EP | 0213406 A2    | 11/1987 |
| EP | 0281986 A2    | 9/1988  |
| WO | 2004071203 A1 | 8/2004  |
| WO | 2009024200 A1 | 2/2009  |
| WO | 2010091871 A1 | 8/2010  |
| WO | 2011049556 A1 | 4/2011  |
| WO | 2012010378 A1 | 1/2012  |
| WO | 2012143515 A1 | 10/2012 |
| WO | 2016196708 A1 | 12/2016 |
| WO | 2017162701 A1 | 9/2017  |
| WO | 2017162715 A1 | 9/2017  |
| WO | 2017216194 A1 | 12/2017 |

OTHER PUBLICATIONS

Desplanques et al., Impact of chemical composition of xanthan and acacia gums on the emulsification and stability of oil-in-water emulsions, Food Hydrocolloids, vol. 27, Issue 2, Jun. 2012, pp. 401-410. (Year: 2012).*

* cited by examiner

*Primary Examiner* — Brent T O'Hern
(74) *Attorney, Agent, or Firm* — Barnes & Thornburg LLP; Scott D. Rothenberger

(57) ABSTRACT

A plant based allergen-free coffee creamer or whitener composition is described that includes components such as a) water; b) at least one sugar ingredient; c) at least one vegetal oil; d) acacia gum; e) xanthan gum, Tragacanth or gellan; and f) optionally a flavor modification agent and/or optionally a cereal component, wherein the composition is substantially free of sunflower lecithin and of nut component(s) and the components equal 100% by weight.

26 Claims, No Drawings

PLANT BASED ALLERGEN-FREE COFFEE CREAMER OR WHITENER COMPOSITION

CROSS-REFERENCE TO RELATED APPLICATIONS

This application claims the benefit of U.S. Provisional Application Ser. No. 62/698,466, filed Jul. 16, 2018, the entirety of which is hereby incorporated herein by reference.

FIELD OF THE INVENTION

The embodiments herein relate generally to compositions suitable as coffee creamers or whiteners that are based on vegetal ingredients. The compositions are allergen-free.

BACKGROUND OF THE INVENTION

Most current coffee creamer or whitener compositions include emulsified fats or oils and rely on dairy or plant proteins for their emulsification capacity. Such ingredients might generate allergies, which is to be labelled accordingly.

Some consumers also appreciate labels with components considered as clean ingredients.

Document WO2012143515 discloses creamers compositions comprising a hydrocolloid, an insoluble divalent salt, a protein, an emulsifier and a vegetable oil. The oil is emulsified in a water phase. The hydrocolloid can be among other microcrystalline cellulose, xanthan gum, gum Arabic, tragacanth or gellan. The protein can be a dairy protein such as casein or whey, or a vegetal protein such as soy protein or pea protein. The system of compounds that is believed to participate to emulsification and/or emulsion stabilization is composed of the hydrocolloid, the protein and the emulsifier. In the example the system associates microcrystalline cellulose, sodium caseinate, and mono- and di-glycerides. Proteins can generate some allergies. There is a need for a system that does not require a protein.

Document EP281986 discloses oil-free compositions suitable as creamers or whiteners. These are based on gelation properties of gums such as xanthan gum, acacia gum or carrageenan. Compositions comprising emulsified oil however remain preferred since oil free systems do not work well, thus there is a need for compositions that include an emulsified oil.

Document WO200471203 discloses non-fat creamer composition comprising an association of microparticulated whey proteins and microcrystalline cellulose as a fat replacer. Compositions comprising emulsified oil however remain preferred since oil free systems do not work well, thus there is a need for compositions that include an emulsified oil. Moreover proteins can generate some allergies and there is a need for a system that does not require a protein.

Document WO200924200 discloses dry, foaming, instant coffee compositions having a coffee whitener component. There is a need for different products, in liquid form, that do not include a coffee component.

Document WO2016196708 discloses creamers compositions comprising a carboxymethylcellulose, a protein, and a vegetable oil. The hydrocolloids can further comprise, among others, microcrystalline cellulose, xanthan gum, gum Arabic, tragacanth or gellan. The composition can further comprise an emulsifier. The system of compounds that is believed to participate in emulsification and/or emulsion stabilization is composed of the hydrocolloid, the protein and the optional emulsifier. Proteins can generate some allergies. A system that does not require a protein is not provided.

Document WO2017162715 discloses liquid plant-based creamers comprising an edible nut, high acyl gellan gum, acacia gum, a buffer, and optionally a vegetable oil. However nuts can generate some allergies. There is a need for other products that do not comprise such allergens. The edible nut is provided in the form of a paste of powdered delivery particles in the composition. Additionally the use of the buffer generates additional costs, and lengthens the number of ingredients to be labelled. The system of compounds that is believed to participate in generating the particles or to stabilize them is composed of the high acyl gellan gum and acacia gum, and have a mean D[4,3] size of from 5 to 16 microns.

Document WO201210378 discloses creamer compositions comprising vegetable oil, protein, maltodextrin, sucrose, lambda carrageenan, gum Arabic and an emulsifier. The system of compounds that is believed to participate in emulsification and/or emulsion stabilization is composed of lambda carrageenan, the protein and the emulsifier. There is a need for a system that does not require a protein or synthetic emulsifier.

Document WO201149556 discloses creamer compositions comprising two emulsifiers, two microcrystalline celluloses, a carrageenan gum, oil, and an antioxidant system having gum Arabic and carotenoids. The examples also involve a protein. Such compositions are however very complex, so there is a need for compositions that are less complex in nature. There is a further need for a system that does not require a protein.

Document EP213406 discloses a spray dried non-dairy coffee whitener that is prepared without the use of protein by incorporating a water soluble, film-forming hydrocolloid in the formulation. The hydrocolloid, such as gum Arabic, when added to an aqueous, fat-containing emulsion concentrate, stabilizes the emulsion through the spray drying step so that when the dried emulsion concentrate is reconstituted in coffee a stable emulsion is formed which effectively whitens the coffee. There is a need for different products, in liquid form.

Document WO 2010091871 describes non-dairy, low protein or protein-free compositions comprising a cellulose based hydrocolloid system. Acacia gum is not disclosed. The compositions are however complex, thus there is a need for less complex compositions.

Document US 20110189373 describes non-dairy, low protein or protein-free powder compositions comprising a cellulose based hydrocolloid system. Acacia gum is not disclosed. There is a need for different products, in liquid form.

Document US 20110189372 describes non-dairy protein free compositions comprising a cellulose based hydrocolloid system. Acacia gum is not disclosed. The compositions are however complex, thus there is a need for less complex compositions.

Document WO2017162701 describes non-dairy compositions comprising a nut, acacia gum, gellan and pea protein. Proteins can generate some allergies. There is a need for a system that does not require a protein.

Document WO2017216194 describes non-dairy compositions comprising coconut, guar gum, gellan and pea protein. Acacia is not disclosed. Proteins can generate some allergies. A system is not disclosed that does not include a protein.

A product "Almond Cooking Cream" was marketed by Distriborg. It contained water, almonds (7%), sunflower oil, agave syrup, stabilizers (Arabic gum, xanthan gum), emulsifier (sunflower lecithin), sea salt, natural flavoring. The almond and the lecithin can generate allergies, thus there is a need for a product that does not include such additives.

A product "Soya Cream" was marketed by Gerblé. It contained soya juice* (95.5%) (water, soy beans), sunflower oil, emulsifier (Arabic gum), cane sugar, thickeners (xanthan gum, carrageenan). However the soy beans comprise proteins that can generate allergies, thus there is a need for products that do not include a protein.

A product "Organic Almond Cream" was marketed by Nutriops. It contained water, almond (7%), almond oil, agave syrup, stabilizers (Arabic gum, xanthan gum), emulsifier (sunflower lecithin), sea salt, natural flavorings. There is a need for emulsifying systems that do not require lecithins. However the almond component can generate allergies, thus there is a need for products that do not include an almond component.

A product "Nut-Pod dairy-free creamer" was marketed by Nutpods. It contained water, coconut cream, almonds, acacia gum, sunflower lecithin, dipotassium phosphate, gellan gum and sea salt. There is a need for emulsifying systems that do not require lecithins. Moreover the almond component can generate allergies thus there is a need for products that do not include an almond component.

BRIEF SUMMARY OF THE INVENTION

The compositions herein provide a clean label that uses hydrocolloids for emulsification.

Plant proteins can generate degradation products such as browning or loss of emulsification capacity during some necessary heat treatments such as indirect UHT processing. The compositions herein provide better flexibility in processes that can be used to manufacture the product.

The invention addresses at least one of the needs or problems mentioned above with a liquid beverage creamer or whitener composition comprising:
a) water
b) at least one sugar ingredient
c) at least one vegetal oil
d) acacia senegal gum,
e) xanthan gum, Tragacanth or gellan
f) optionally flavor modification agents.
wherein the composition is substantially free of sunflower lecithin and of nut components.

In one embodiment the composition further comprises a cereal component g), for example, an oat component. In one aspect the association to the water and the cereal component provides a cereal milk.

The invention delivers an allergen-free, dairy-free, for example, plant based, coffee creamer or whitener solution, with satisfying labelling requirements, creaming, whitening and/or organoleptic properties, stability, and/or processability.

In one aspect the composition is a dairy-free, allergen-free, plant-based composition, for example, a dairy-free, allergen-free, cereal-milk-based, for example, an oat-milk-based, composition.

It is believed that the combination of acacia senegal gum hydrocolloid and xanthan gum hydrocolloid, Tragacanth or gellan, provides stabilization with a desirable particle size with a single mode distribution. Some synergies between the acacia gum hydrocolloid and the additional hydrocolloid(s) (xanthan gum, Tragacanth and/or gellan) can be observed, that provide optimal emulsion stability. It is believed that the hydrocolloid system can also create a fluid gel network.

It is believed that denaturation of proteins reduces the emulsification capacity of the protein and increases browning during heat treatment. It is believed that the browning and stability issues reduce the whitening capacity of the creamer when added to coffee and negatively impacts consumer appeal. The hydrocolloids as the emulsification system of the composition herein allows for undergoing various pasteurization or sterilization processing steps, for example, involving direct or indirect UHT (Ultra-High Temperature) treatments, for example, involved in Extended Shelf Life (ESL) or Aseptic processing.

In some embodiments the invention allows one or several of the following:

Non-protein plant based clean label emulsification systems.

Stable to indirect UHT heat treatment where other plant based proteins are challenged.

Removal of the need to use buffers or other additives to stabilize proteins during processing and when added to coffee which result in a cleaner label and reduced number of ingredients for added operational efficiency.

Can be added to coffee over wide usage range without concern of protein precipitation which can result in negative consumer appeal.

Increased whiteness, typically by minimizing Maillard browning reaction by products.

DETAILED DESCRIPTION

Definitions

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Herein, unless otherwise provided, amounts refer to amounts by weight.

General Composition and Amounts

The composition comprises water. Water is typically present in an amount balancing the amounts of other ingredients to 100% by weight. In an embodiment water is present in an amount between 40% and 80% by weight, for example, from 40% to 45% or from 45% to 50% or from 50% to 55% or from 55% to 60% or from 60% to 65% or from 65% to 70% or from 70% to 75%, or from 75% to 80%.

In one embodiment the water quality is monitored to ensure sufficiently low level of cations to ensure emulsification stability is not impacted.

In one embodiment the composition comprises:
a) 40% to 80% by weight of water
b) 15% to 35% by weight of at least one sugar ingredient
c) 5% to 12% by weight of at least one vegetal oil
d) 1.00% to 10.00% by weight of acacia gum,
e) 0.01% to 0.10% by weight of xanthan gum,
f) optionally flavor modification agent(s), and
g) optionally a cereal component.
the total being 100% by weight.

In one embodiment the composition comprises:
d) 2.00% to 5.00% by weight of acacia gum, and
e) from 0.02% to 0.06% of xanthan gum.

The composition is substantially free of sunflower lecithin. In one embodiment the composition is free of sunflower lecithin. Should the composition comprise a minor amount of sunflower lecithin the amount is less than 0.1% by weight, for example, less than 0.05%, for example, less than 0.01%, for example, less than 0.005%, for example, less than 0.001%.

In one embodiment the composition is substantially free of soy lecithin. In one embodiment the composition is free of soy lecithin. Should the composition comprise a minor amount of soy lecithin the amount is less than 0.1% by weight, for example, less than 0.05%, for example, less than 0.01%, for example, less than 0.005%, for example, less than 0.001%.

In one embodiment the composition is substantially free of lecithin. In one embodiment the composition is free of lecithin. Should the composition comprise a minor amount of lecithin this amount is less than 0.1% by weight, for example, less than 0.05%, for example, less than 0.01%, for example, less than 0.005%, for example, less than 0.001%.

It is believed that removal lecithin leads to multimodal oil droplets sizes, which negatively affects stability, whitening and/or organoleptic properties.

The composition is substantially free of nuts. In one embodiment the composition is free of nuts. Examples of nuts are hazelnut, walnut, almond, cashew, peanut, chestnut, macadamia, pistachios, pecan, or their mixtures. Should the composition comprise a minor amount of a nut component(s) this amount is less than 0.1% by weight, for example, less than 0.05%, for example, less than 0.01%, for example, less than 0.005%, for example, less than 0.001%.

In one embodiment the composition is substantially free of protein. In one embodiment the composition is free of protein. Should the composition comprise a minor amount of protein this amount is less than 0.1% by weight, for example, less than 0.05%, for example, less than 0.01%, for example, less than 0.005%, for example, less than 0.001%.

The composition is typically in the form of an emulsion of vegetal oil droplets in water. In an embodiment the droplets have a volume-mean size of from 0.5 to 1.8 am, for example, from 0.5 to 1.0 m. In one embodiment the droplets have a weight-mean size of from 0.5 to 1.8 am, for example, from 0.5 to 1.0 m. In another embodiment the droplets have a mean D[4,3] size of less than 5.0 am, for example, less than 2.5 am, for example, from 0.5 to 1.8 am, for example, from 0.5 to 1.0 m. In one embodiment the droplets have a D90 size of at most 2.0, for example, from 1.0 to 2.0 m. Compositions with such droplets size present good stability and/or whitening power. It is believed that that system defined by the acacia gum and the further hydrocolloid selected from xanthan gum, tragacanth or gellan provide emulsification and/or emulsion stability, with such droplets sizes.

Sugar Ingredient

The compositions comprise at least one sugar ingredient. Such an ingredient can contribute to providing some appreciated sweetness to the product. It can also provide some bulking to the composition. The sugar ingredient can be, for example, sucrose, fructose, saccharose, glucose, maltodextrin, dextrose, sorbitol, xylitol, or a mixture thereof. In one embodiment it is a corn syrup, for example, a high fructose corn syrup, a corn syrup solid, cane sugar, beetroot sugar, honey, agave, maple syrup, or a mixture thereof. In one embodiment it is a mixture of at least two of sucrose, fructose, saccharose, glucose, maltodextrin, dextrose, sorbitol, xylitol, a corn syrup, for example, a high fructose corn syrup, a corn syrup solid, cane sugar, beetroot sugar, honey, agave, maple syrup.

In one embodiment the sugar ingredient is present in an amount of from 15% to 35% by weight. For example, the amount is from 15% to 20%, or from 20% to 25%, or from 25% to 30%, or from 25% to 30%, or from 30% to 35%.

Vegetal Oil

The composition comprises at least one vegetal oil. Examples of such oils include coconut oil, canola oil, soybean oil, sunflower oil, safflower oil, palm oil, palm kernel oil, and various mixtures thereof.

In one embodiment the vegetal oil is present in an amount of from 5% to 12% by weight, for example, from 5% to 6%, or from 6% to 7%, or from 7% to 8%, or from 8% to 9%, or from 9% to 10%, or from 10% to 11%, or from 11% to 12%.

Acacia Gum

The composition comprises an acacia senegal gum. Acacia senegal gums are hydrocolloids known by one skilled in the art, and are commercially available. They are also referred to as arabic gum. By Acacia senegal gum is meant a gum produced from natural exudates or produced by tapping stems or branches of trees of genus Acacia senegal. Acacia gum is a natural, soluble food fibre. It is a macromolecule with high molar mass (typically with a weight-average molecular weight between 4.105 and 2.106 g/mol). Its intrinsic viscosity is typically less than 0.2 dl/g (as measured, for example, according to Al-Assaf et al, Food Hydrocolloids, 2005, 19, 647-667; Flindt et al, Food Hydrocolloids, 2005, 19, 687-701). Acacia Gum is an acacia exudate, purified using a physical process well known to those skilled in the art, having the steps of grinding, dissolving in water, filtering, centrifuging, microfiltration, then spray drying or granulation. There are two types of Acacia Gum: Acacia seyal and Acacia senegal. Their structures are slightly different. They can however be distinguished by a very different rotating power and by their proportion of simple sugars (24% in Acacia senegal).

In one embodiment, the Acacia senegal gum is mixed or associated with Acacia seyal gum. Examples of acacia Senegal gums that can be used include Instantgum ranges marketed by Nexira, such as Instantgum AA or Instantgum AX and those from TIC Gums such as Tic Gums Gum Acacia (Arabic) Spray Dry.

The acacia gum can be provided in an amount sufficient to provide emulsification properties. The amount of acacia gum can be fine-tuned for stability according to the pH, the water quality, the transportation conditions and/or the desired shelf life.

In one embodiment the acacia gum is present in an amount from 1.00% to 10.00% by weight, for example, from 1.00% to 2.00%, or from 2.00% to 3.00%, or from 3.00% to 4.00%, or from 4.00% to 5.00%, or from 5.00% to 6.00%, or from 6.00% to 7.00%, or from 7.00% to 8.00%, or from 8.00% to 9.00%, or from 9.00% to 10.00%.

Further Hydrocolloid

The composition comprises at least one hydrocolloid further to the acacia gum. The further hydrocolloid is a xanthan gum, tragacanth or gellan. Such compounds are known by one skilled in the art and are commercially available. Gellan can be, for example, a high acyl gellan.

The further hydrocolloid can be provided in an amount sufficient to provide viscosity and create a fluid gel network. This can improve stability without impacting consumer perception.

In one embodiment the at least one further hydrocolloid is present in an amount from 0.01% to 0.10% by weight, for example, from 0.01% to 0.02%, or from 0.02% to 0.03%, or from 0.03% to 0.04%, or from 0.04% to 0.05%, or from 0.05% to 0.06%, or from 0.06% to 0.07%, or from 0.07% to 0.08%, or from 0.08% to 0.09%, or from 0.09% to 0.10%.

In one embodiment xanthan gum is present in an amount from 0.01% to 0.10% by weight, for example, from 0.01% to 0.02%, or from 0.02% to 0.03%, or from 0.03% to 0.04%, or from 0.04% to 0.05%, or from 0.05% to 0.06%, or from 0.06% to 0.07%, or from 0.07% to 0.08%, or from 0.08% to 0.09%, or from 0.09% to 0.10%.

In one embodiment tragacanth is present in an amount from 0.01% to 0.10% by weight, for example, from 0.01% to 0.02%, or from 0.02% to 0.03%, or from 0.03% to 0.04%, or from 0.04% to 0.05%, or from 0.05% to 0.06%, or from 0.06% to 0.07%, or from 0.07% to 0.08%, or from 0.08% to 0.09%, or from 0.09% to 0.10%.

In one embodiment gellan, such as high acyl gellan, is present in an amount from 0.01% to 0.10% by weight, for example, from 0.01% to 0.02%, or from 0.02% to 0.03%, or from 0.03% to 0.04%, or from 0.04% to 0.05%, or from 0.05% to 0.06%, or from 0.06% to 0.07%, or from 0.07% to 0.08%, or from 0.08% to 0.09%, or from 0.09% to 0.10%.

Flavor Modification Agents

The composition can comprise some flavor modification agent(s), different from the sugar ingredient. These typically affect the taste of the composition, the amount thereof is usually determined according to taste that is desired. Examples can include salts, sweeteners, flavors, flavor modifiers, fruits or fruit extracts. Popular flavor modification agents, for example, include vanilla flavor or extract, hazelnut artificial flavor, amaretto, cinnamon, chocolate, caramel.

Examples of salts include sodium chloride, for example, sea salt.

Cereal Components

The compositions can comprise a cereal component, such as a component appropriate to provide, with a water a cereal milk (as alternative to animal milk). Examples of appropriate cereals or corresponding components can include, for example, wheat, rye, spelt, barley, oat, millet, sorghum, rice, teff, and mixtures or combinations thereof. The cereal component can be obtained from the corresponding cereal plant.

Such cereal components have been described and/or are commercially available, for example, as appropriate to provide milks or beverages such as oat milk, rice milk etc. The cereal component can be, for example, a fraction of the corresponding cereal plant, an extract thereof or a modified extract thereof. The component can be provided in the form of a powder, or in the form of a liquid preparation such as a slurry or syrup. The cereal component typically forms a dispersion in the water, for example, a suspension.

Methods for the preparation of cereals components are known in the art and typically comprise steps such as:
- a separation of a nutritive fraction of a plant, for example, separation of beans of seeds from stem,
- optionally a refinement of the fraction, for example, by dehulling
- a mechanical, chemical, physico-chemical; and/or enzymatic disruption of the plant-matter and hydration and/or combination with a solution, followed by mechanical separation of an aqueous fraction from starchy and/or fibrous matter, e.g., by decentering, centrifugation or filtration.

In an embodiment, the cereal component comprises a hydrolyzed cereal component. Methods for the preparation of such a cereal component typically comprise mixing cereal material, such as an oat material, for example, rolled oats, milled oats, oat flour or oatmeal, with water and treated enzymatically by amylases to hydrolyze starch followed by removal of suspended matter, and optionally by drying.

It is noted that the dispersed particles might interfere in the measurement of the oil particles size, such that the measured value(s) reflects a mixture.

The amount of cereal material can be, for example, from 0.1% by weight to 10.0% by weight, for example, from 0.1% by weight to 2.0% by weight, for example, from 0.5% by weight to 1.5% by weight. Limited amounts are found suitable to provide interesting organoleptic properties, product identification and/or labelling, and/or stability, while preventing presence of allergens.

Other

In one embodiment the pH of the composition is of at most 7.0, for example, from 4.0 to 6.5 or from 4.0 to 6.0. It is believed that such a pH provides optimal functionality and emulsification characteristics of the hydrocolloids.

Due to the presence of the selected hydrocolloids, buffers are not required to stabilize the creamer during coffee application. Buffers are frequently used in coffee creamers containing dairy or plant based proteins to buffer against the low pH of the coffee. If the creamer is not buffered adequately, the protein will denature and agglomerate following addition to coffee. This issue is exaggerated with portion control packaging as the volume of creamer added is restricted to increments of 1 cup at a small volume (<13 ml).

In one embodiment the composition is substantially free of buffering agents. Should the composition comprise a minor amount of a buffering agents, the amount is less than 0.1% by weight, for example, less than 0.05%, for example, less than 0.01%, for example, less than 0.005%, for example, less than 0.001%.

Buffering agents include, but are not limited to, for example, monophosphates, diphosphates, sodium mono- and bicarbonates, potassium mono- and bicarbonates, for example, potassium phosphate, dipotassium phosphate, potassium hydrophosphate, sodium bicarbonate, trisodium citrate (also referred to as sodium citrate), sodium phosphate, disodium phosphate, sodium hydrophosphate, and sodium tripolyphosphate, sodium bicarbonate.

The composition can comprise further components, different from the ones mentioned above. In one embodiment the composition comprises further gums and/or hydrocolloids, such as guar gums, locust bean gum or tara gums. In one embodiment the amount of such further gums and/or hydrocolloids is of less than 1.0% by weight, for example, less than 0.05% by weight, if present.

Packaging

The compositions described herein are typically packaged in a container. The container is then typically sealed, for example, with a cap and/or a flexible lid. The container can, for example, have a holding capacity or volume of up to 2 kg or 2 L, for example, up to 1.5 kg or 1.5 L, for example, up to 1.0 kg or 1.0 L, for example, up to 500 g or 500 mL, for example, up to 250 g or 250 mL, for example, up to 125 g or 125 mL, for example, up to 100 g or 100 mL, for example, up to 50 g or 50 mL, for example, up to 25 g or 25 mL. The container might provide one or several servings. Containers of up 250 g or 250 mL, preferably up to 100 g or 100 mL, typically provide a single serving. The container can be a bottle or a cup, for example, a plastic thermoformed cup. The sealing can be provided by a flexible lid and/or or a plastic cap. The flexible lid can be, for example, thermosealed to or on the opening of the bottle or cup. The container can be a small single cup, for example, of from 5 g or 5 mL to 15 g or 15 mL, and, for example, sealed with a flexible lid. Such small single cups can be offered alone or grouped in a secondary packaging.

The composition in the container can be can be stored, transported and/or distributed at a chilled temperature of 0° C. to 10° C., or at a room temperature, for example, or from 15° C. to 25° C.

Process

The composition can be made by any appropriate process involving mixing its components. The mixing typically involves emulsification of the oil in the water.

The process can comprise a step of mixing and homogenizing components a), b), c), d), e) and optionally f) and/or optionally g) to provide an emulsion of the vegetal oil in water.

The process can involve a step of heat-treating the composition or its components, for example, by pasteurization, sterilization and/or ultra-high temperature treatments (UHT). The heat treatment can be a direct heat treatment or an indirect heat treatment.

The homogenization can be a single step homogenization or a double step homogenization.

In an embodiment, the process involves an indirect UHT heat treatment with a single step or double step homogenization.

The process can involve a step of dosing the composition in a container, and then sealing, for example, according to aseptic processing or Extended Shelf Life processing.

Process of Use

The compositions described herein can be used in a process of creaming or whitening a beverage. The process typically comprises the step of mixing the compositions described herein with a beverage. Upon mixing, the composition disperses in the beverage, thereby modifying its taste and/or mouth feel, and whitens the beverage.

The beverage can be, for example, a coffee, tea, chocolate or fruit beverage. Such beverages comprise corresponding components, extracts and/or flavors.

In one embodiment the beverage is a hot beverage. The composition is typically mixed at chilled temperature or room temperature.

In one embodiment at least 2 parts by weight, for example, at least 3 parts, for example, at least 4 parts, for example, at least 5 parts, of the beverage are mixed with 1 part by weight of the composition. In one embodiment the container is a single serve container and all the composition of the container is mixed with the beverage.

The invention can be further described with reference to the following non-limiting Examples. It will be apparent to those skilled in the art that many variations can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight. The letter "C" indicates a comparative example.

Examples

Coffee creamer compositions are prepared and evaluated. The compositions, preparation procedures and results are reported in the tables below.

Preparation Procedures
Preparation Procedure 1
1. Premix/dispersion of stabilizers:
   Blend Xanthan/Tragacanth (as applicable) with portion of the Sunflower Oil (ensure no clumps)
   Blend gum acacia with portion of sugar
   1a. If using Gellan/Guar/Tara/Locus Bean Gums disperse in a portion of sugar.
2. Add Xanthan-oil (or other gum pre-mix) mixture to water (@ 110° F. 10° F.). Mix for 3-5 minutes.
3. Add Gum Acacia-sugar blend and mix for 8-10 minutes.
4. Slowly add the remainder of the sunflower oil (ribbon in)
5. Add remainder of sugar and mix for 2-5 minutes to ensure all sugar is in solution
6. Add salt and flavors (if required). Mix 2-5 minutes to ensure even distribution.
7. Transfer mixture to pre-process homogenizer at 110° F.±10° F. and homogenize at $1^{st}$ Stage=2000 PSI, $2^{nd}$ Stage=500 PSI
8. Cool mixture in-line to <90° F.
9. Transfer immediately to UHT Indirect tube-in-tube processor. Process using following conditions:
   a. pre-heat=178° F.
   b. hold temp 295° F. for 3-5 seconds
   c. In-line cooling between 130° F.-160° F. followed by homogenization at $1^{st}$ stage=2000 PSI, $2^{nd}$ Stage=500 PSI
   d. Cool to less than 50° F.
10. Fill in to sterile containers and move immediately refrigerated storage to cool fully.

Preparation Procedure 2
1. Premix/dispersion of stabilizers (as specified):
   Blend Xanthan with portion of the Sunflower Oil (ensure no clumps);
   Blend gum acacia & Gellan Gum (if applicable) with portion of sugar"
2. Add all gum pre-mix blends to water (@ 110° F.±10° F.). Mix for 8-10 minutes.
3. Add Oat Component and mix for 3-5 minutes.
4. Slowly add the remainder of the sunflower oil (ribbon in)
5. Add remainder of sugar and mix for 2-5 minutes to ensure all sugar is in solution
6. Add flavors (as required). Mix 2-5 minutes to ensure even distribution.
7. Transfer mixture to pre-process homogenizer at 110° F.±10° F. and homogenize at $1^{st}$ Stage=2000 PSI, $2^{nd}$ Stage=500 PSI
8. Cool mixture in-line to <90° F.
9. Transfer immediately to UHT Indirect tube-in-tube processor. Process using following conditions:
   a. pre-heat=178° F.
   b. hold temp 295° F. for 3-5 seconds
   c. In-line cooling between 130° F.-160° F. followed by homogenization at $1^{st}$ stage=2000 PSI, $2^{nd}$ Stage=500 PSI
   d. Cool to less than 50° F.
10. Fill in to sterile containers and move immediately refrigerated storage to cool fully.

Preparation Procedure 3
1. Add protein to 110° F. water and mix for 5-10 minutes
2. Add buffering salts and blend until fully incorporated
3. Premix/dispersion of stabilizers:
   Blend Xanthan and Lecithin (if applicable) with portion of the Sunflower Oil
   Blend gum acacia with portion of sugar"
4. Add all gum pre-mix blends and mix for 8-10 minutes.
3. Slowly add the remainder of the sunflower oil (ribbon in)
5. Add remainder of sugar and mix for 2-5 minutes to ensure all sugar is in solution 6. Add flavors and salt (if required). Mix 2-5 minutes to ensure even distribution.
7. Transfer mixture to pre-process homogenizer at 110° F.±10° F. and homogenize at $1^{st}$ Stage=2000 PSI, $2^{nd}$ Stage=500 PSI
8. Cool mixture in-line to <90° F.
9. Transfer immediately to UHT Indirect tube-in-tube processor. Process using following conditions:

a. pre-heat=178° F.
b. hold temp 295° F. for 3-5 seconds
c. In-line cooling between 130° F.-160° F. followed by homogenization at $1^{st}$ stage=2000 PSI, $2^{nd}$ Stage=500 PSI
d. Cool to less than 50° F.
10. Fill in to sterile containers and move immediately refrigerated storage to cool fully.

Evaluations

| | |
|---|---|
| Coffee Abuse | The coffee abuse evaluates the composition upon mixing with coffee. One adds 9 ml of composition to hot 16 ounce acidic coffee (pH ≤4.6) brewed with tap/non-filtered water. One monitors for feathering/flocculation (>2 specs/white particles observed is considered a Fail). |
| Particle Size Analysis | Performed with Mastersizer 3000 with Hydro LV attachment, within 72 hrs after preparation
D[4,3] is the mean diameter by volume. $D_{90}$ is the diameter value for which 90% of the particles is smaller.
The peak mode indicates the number of peaks in the particle size analysis.
When the peak mode is 1 indicate the values reflect the distribution of solely of emulsified oil droplets. When the peak mode is 2 of 3 the values reflect the distribution of emulsified oil droplets and other non-dissolved components, for example, oat, pea proteins or non-solubilized gums. |
| Qualitative Analysis by Visual Observation | Evaluation at abuse storage (40° C.); evaluate for separation/uniformity and any other apparent visual |

| | Example 1 | Example 2 | Example 3 |
|---|---|---|---|
| Water | 62.57 | 78.99 | 40.80 |
| Cane Sugar | 25.00 | 15.00 | 35.00 |
| Sea Salt | 0.05 | 0.00 | 0.10 |
| Gum *Acacia* Senegal (Arabic), Spray Dry, supplier TIC GUMS | 3.50 | 1.00 | 10.00 |
| Gum *Acacia* Seyal, supplier Agropur | | | |
| Gum Tragacanth T/3, supplier AEP Colloids | | | |
| Guar Gum 8/22, supplier Tic Gums | | | |
| Xanthan Gum 7180, supplier Agropur | 0.03 | 0.01 | 0.10 |
| Gellan Gum HA-B[E], High Acyl, supplier CP Kelco | | | |
| Locus Bean Gum 246, supplier Dupont | | | |
| Tara Gum, Aglumix 01, supplier Silva Team) | | | |
| Topcithin S (sunflower lecithin) - supplier, Cargill | | | |
| Natural Flavors | 0.35 | 0.00 | 2.00 |
| High Oleic Sunflower Oil - supplier Cargill | 8.50 | 5.00 | 12.00 |
| TriSodium Citrate | | | |
| 50% liquid solution of Dipotassium Phosphate (as is) | | | |
| Sodium Bicarbonate, Anhydrous | | | |
| Pea Protein (Farbest BLS) | | | |
| Hydrolyzed Oat powder, ref 30753802, supplied by Kerry Ingredients | | | |
| Preparation procedure | 1 | 1 | 1 |
| Coffee Abuse Test | Pass | Pass | Pass |
| pH | 4.84 | 5.99 | 4.76 |
| Dx (90) (μm) | 1.570 | 1.620 | 1.370 |
| D [4,3] (μm) | 0.913 | 0.980 | 0.828 |
| D [3,2] (μm) | 0.711 | 0.788 | 0.646 |
| Mode Count | 1 | 1 | 1 |
| Visual Observation (24 Hr) | Uniform, no separation | Uniform, no separation | Uniform, no separation |
| Visual Observation (7-14 Days) | Uniform, No separation | Uniform, minimal separation; lower whitening capacity due to oil level. | Uniform, No separation |
| Visual Observation (30+ days) | Minimal to no separation observed in abuse storage at day 30. | Slight separation observed in abuse storage at day 30; whitening | Minimal to no separation observed at day 30; no impact to whitening ability |

-continued

|  | Example 1 | Example 2 | Example 3 |
|---|---|---|---|
|  | Small amount of separation observed in abuse storage at day 72. | unaffected by age. | in coffee |

|  | Example 4 | Example 5 | Example 6 |
|---|---|---|---|
| Water | 61.07 | 78.915 | 62.900 |
| Cane Sugar | 25.00 | 15.000 | 25.000 |
| Sea Salt | 0.05 |  | 0.050 |
| Gum Acacia Senegal (Arabic), Spray Dry, supplier TIC GUMS | 5.00 | 1.000 | 3.500 |
| Gum Acacia Seyal, supplier Agropur |  |  |  |
| Gum Tragacanth T/3, supplier AEP Colloids |  |  | 0.050 |
| Guar Gum 8/22, supplier Tic Gums |  | 0.050 |  |
| Xanthan Gum 7180, supplier Agropur | 0.03 |  |  |
| Gellan Gum HA-B[E], High Acyl, supplier CP Kelco |  | 0.035 |  |
| Locus Bean Gum 246, supplier Dupont |  |  |  |
| Tara Gum, Aglumix 01, supplier Silva Team) |  |  |  |
| Topcithin S (sunflower lecithin) - supplier, Cargill |  |  |  |
| Natural Flavors | 0.35 |  |  |
| High Oleic Sunflower Oil - supplier Cargill | 8.50 | 5.000 | 8.500 |
| TriSodium Citrate |  |  |  |
| 50% liquid solution of Dipotassium Phosphate (as is) |  |  |  |
| Sodium Bicarbonate, Anhydrous |  |  |  |
| Pea Protein (Farbest BLS) |  |  |  |
| Hydrolyzed Oat powder, ref 30753802, supplied by Kerry Ingredients |  |  |  |
| Preparation procedure | 1 | 1 | 1 |
| Coffee Abuse Test | Pass | Pass | Pass |
| pH | 4.67 | 6.33 | 4.77 |
| Dx (90) (μm) | 1.349 | 1.72 | 1.33 |
| D [4,3] (μm) | 0.804 | 1.05 | 0.79 |
| D [3,2] (μm) | 0.638 | 0.857 | 0.618 |
| Mode Count | 1 | 1 | 1 |
| Visual Observation (24 Hr) | Uniform, no separation | Uniform, no separation | Uniform, No separation |
| Visual Observation (7-14 Days) | Uniform, No separation | Uniform, no separation | Uniform, No separation |
| Visual Observation (30+ days) | Minimal to no separation observed at day 30; no impact to observed whitening ability in coffee | Minimal to no separation observed in abuse storage at day 30 | Minimal to no separation observed in abuse storage at day 30 |

|  | Example 7 | Example 8 | Example 9 |
|---|---|---|---|
| Water | 62.565 | 62.465 | 64.065 |
| Cane Sugar | 25.000 | 25.000 | 25.000 |
| Sea Salt | 0.050 | 0.050 |  |
| Gum Acacia Senegal (Arabic), Spray Dry, supplier TIC GUMS | 3.500 | 3.500 | 2.000 |
| Gum Acacia Seyal, supplier Agropur |  |  |  |
| Gum Tragacanth T/3, supplier AEP Colloids |  |  |  |
| Guar Gum 8/22, supplier Tic Gums |  |  |  |
| Xanthan Gum 7180, supplier Agropur |  |  |  |
| Gellan Gum HA-B[E], High Acyl, supplier CP Kelco | 0.035 | 0.035 | 0.035 |
| Locus Bean Gum 246, supplier Dupont |  | 0.100 |  |
| Tara Gum, Aglumix 01, supplier Silva Team) |  |  | 0.050 |
| Topcithin S (sunflower lecithin) - supplier, Cargill |  |  |  |

-continued

|  | Example 7 | Example 8 | Example 9 |
|---|---|---|---|
| Natural Flavors | 0.350 | 0.350 | 0.350 |
| High Oleic Sunflower Oil - supplier Cargill | 8.500 | 8.500 | 8.500 |
| TriSodium Citrate | | | |
| 50% liquid solution of Dipotassium Phosphate (as is) | | | |
| Sodium Bicarbonate, Anhydrous | | | |
| Pea Protein (Farbest BLS) | | | |
| Hydrolyzed Oat powder, ref 30753802, supplied by Kerry Ingredients | | | |
| Preparation procedure | 1 | 1 | 1 |
| Coffee Abuse Test | Pass | Pass | Pass |
| pH | 4.87 | 4.93 | 5.13 |
| Dx (90) (μm) | 1.98 | 1.94 | 1.75 |
| D [4,3] (μm) | 1.04 | 1.17 | 1.04 |
| D [3,2] (μm) | 0.743 | 0.795 | 0.83 |
| Mode Count | 1 | 1 | 1 |
| Visual Observation (24 Hr) | Uniform, no separation | Uniform, No separation | Uniform, No separation |
| Visual Observation (7-14 Days) | Uniform, No separation | Uniform, No separation; brown specs settled at bottom from LBG. | Uniform, No separation |
| Visual Observation (30+ days) | Minimal to no separation observed in abuse storage at day 45 | Minimal to no separation observed in abuse storage at day 45 | Very slight separation at day 30; whitening capacity uneffected |

|  | Example 10 | Example 11 | Example 12 |
|---|---|---|---|
| Water | 63.065 | 63.065 | 64.960 |
| Cane Sugar | 25.000 | 25.000 | 25.000 |
| Sea Salt | | | 0.050 |
| Gum Acacia Senegal (Arabic), Spray Dry, supplier TIC GUMS | 3.000 | 3.000 | 1.000 |
| Gum Acacia Seyal, supplier Agropur | | | |
| Gum Tragacanth T/3, supplier AEP Colloids | | | |
| Guar Gum 8/22, supplier Tic Gums | | 0.050 | 0.100 |
| Xanthan Gum 7180, supplier Agropur | | | |
| Gellan Gum HA-B[E], High Acyl, supplier CP Kelco | 0.035 | 0.035 | 0.040 |
| Locus Bean Gum 246, supplier Dupont | | | |
| Tara Gum, Aglumix 01, supplier Silva Team) | 0.050 | | |
| Topcithin S (sunflower lecithin) - supplier, Cargill | | | |
| Natural Flavors | 0.350 | 0.350 | 0.350 |
| High Oleic Sunflower Oil - supplier Cargill | 8.500 | 8.500 | 8.500 |
| TriSodium Citrate | | | |
| 50% liquid solution of Dipotassium Phosphate (as is) | | | |
| Sodium Bicarbonate, Anhydrous | | | |
| Pea Protein (Farbest BLS) | | | |
| Hydrolyzed Oat powder, ref 30753802, supplied by Kerry Ingredients | | | |
| Preparation procedure | 1 | 1 | 1 |
| Coffee Abuse Test | Pass | Pass | Pass |
| pH | 5.21 | 5.13 | 5.56 |
| Dx (90) (μm) | 1.59 | 1.58 | 3.06 |
| D [4,3] (μm) | 0.947 | 0.935 | 1.75 |
| D [3,2] (μm) | 0.745 | 0.739 | 1.26 |
| Mode Count | 1 | 1 | 1 |
| Visual Observation (24 Hr) | Uniform, No separation | Uniform, No separation | Uniform, No separation |
| Visual Observation (7-14 Days) | Uniform, No separation | Uniform, No separation | Uniform, No separation |
| Visual Observation (30+ days) | Minimal to no separation observed in abuse storage at day 30 | Minimal to no separation observed in abuse storage at day 30 | Minimal to no separation observed at Day 72 in abuse storage sample |

|  | Example 13 | Example 14 | Example 15C |
|---|---|---|---|
| Water | 62.465 | 62.468 | 62.42 |
| Cane Sugar | 25.000 | 25.000 | 25 |
| Sea Salt | 0.000 | 0.000 | 0.05 |
| Gum *Acacia* Senegal (Arabic), Spray Dry, supplier TIC GUMS | 3.000 | 3.000 | 3.5 |
| Gum *Acacia* Seyal, supplier Agropur |  |  |  |
| Gum Tragacanth T/3, supplier AEP Colloids |  |  |  |
| Guar Gum 8/22, supplier Tic Gums |  |  |  |
| Xanthan Gum 7180, supplier Agropur | 0.035 |  | 0.03 |
| Gellan Gum HA-B[E], High Acyl, supplier CP Kelco |  | 0.033 |  |
| Locus Bean Gum 246, supplier Dupont |  |  |  |
| Tara Gum, Aglumix 01, supplier Silva Team) |  |  |  |
| Topcithin S (sunflower lecithin) - supplier, Cargill |  |  |  |
| Natural Flavors |  |  |  |
| High Oleic Sunflower Oil - supplier Cargill | 8.500 | 8.500 | 8.5 |
| TriSodium Citrate |  |  |  |
| 50% liquid solution of Dipotassium Phosphate (as is) |  |  | 0.5 |
| Sodium Bicarbonate, Anhydrous |  |  |  |
| Pea Protein (Farbest BLS) |  |  |  |
| Hydrolyzed Oat powder, ref 30753802, supplied by Kerry Ingredients | 1.000 | 1.000 |  |
| Preparation procedure | 2 | 2 | 1 |
| Coffee Abuse Test | Pass | Pass | Pass; more oil on the surface |
| pH | 5.11 | 5.23 | 7.2 |
| Dx (90) (μm) | 16.5 | 3.75 | 1.72 |
| D [4,3] (μm) | 6.48 | 4.6 | 2.63 |
| D [3,2] (μm) | 0.925 | 0.66 | 0.648 |
| Mode Count | 3 | 2 | 3 |
| Visual Observation (24 Hr) | Uniform, No separation | Uniform, No separation | No Separation immediately following processing |
| Visual Observation (7-14 Days) | Minimal separation, settling of oat particulate visible; notably more settling compared to gellan gum variant | Minimal separation, settling of oat particulate visible | Significant separation observed at ~11 day age |
| Visual Observation (30+ days) | N/A | Slight separation at day 30 in abuse storage, settling of oat particulate visible |  |

|  | Example 16C | Example 17C | Example 18C |
|---|---|---|---|
| Water | 62.82 | 62.82 | 61.72 |
| Cane Sugar | 25 | 25 | 25 |
| Sea Salt | 0.05 | 0.05 |  |
| Gum *Acacia* Senegal (Arabic), Spray Dry, supplier TIC GUMS | 3.5 | 3.5 | 1 |
| Gum *Acacia* Seyal, supplier Agropur |  |  |  |
| Gum Tragacanth T/3, supplier AEP Colloids |  |  |  |
| Guar Gum 8/22, supplier Tic Gums |  |  |  |
| Xanthan Gum 7180, supplier Agropur | 0.03 | 0.03 | 0.03 |
| Gellan Gum HA-B[E], High Acyl, supplier CP Kelco |  |  |  |
| Locus Bean Gum 246, supplier Dupont |  |  |  |
| Tara Gum, Aglumix 01, supplier Silva Team) |  |  |  |
| Topcithin S (sunflower lecithin) - supplier, Cargill |  |  |  |
| Natural Flavors |  |  |  |
| High Oleic Sunflower Oil - supplier Cargill | 8.5 | 8.5 | 8.5 |
| TriSodium Citrate | 0.1 |  | 0.75 |

-continued

|  | Example 16C | Example 17C | Example 18C |
|---|---|---|---|
| 50% liquid solution of Dipotassium Phosphate (as is) |  |  | 2.5 |
| Sodium Bicarbonate, Anhydrous |  | 0.1 |  |
| Pea Protein (Farbest BLS) |  |  | 0.5 |
| Hydrolyzed Oat powder, ref 30753802, supplied by Kerry Ingredients |  |  |  |
| Preparation procedure | 1 | 1 | 3 |
| Coffee Abuse Test | Pass; more oil on the surface | Pass; more oil on the surface | Fail |
| pH | 5.38 | 7.28 | 7.77 |
| Dx (90) (μm) | 1.42 | 1.3 | 2.12 |
| D [4,3] (μm) | 0.85 | 0.783 | 2.36 |
| D [3,2] (μm) | 0.684 | 0.624 | 0.75 |
| Mode Count | 1 | 1 | 2 |
| Visual Observation (24 Hr) | No separation immediately following processing | No separation immediately following processing | Separation w/in 24 hrs of processing |
| Visual Observation (7-14 Days) | Significant separation observed before 7 day age | Significant separation observed before 7 day age | Completely Separated |
| Visual Observation (30+ days) |  |  |  |

|  | Example 19C | Example 20C | Example 21C |
|---|---|---|---|
| Water | 61.22 | 59.72 | 61.1 |
| Cane Sugar | 25 | 25 | 25 |
| Sea Salt |  |  |  |
| Gum *Acacia* Senegal (Arabic), Spray Dry, supplier TIC GUMS | 1 | 3 | 1 |
| Gum *Acacia* Seyal, supplier Agropur |  |  |  |
| Gum Tragacanth T/3, supplier AEP Colloids |  | 35 |  |
| Guar Gum 8/22, supplier Tic Gums |  |  |  |
| Xanthan Gum 7180, supplier Agropur | 0.03 | 0.03 | 0.03 |
| Gellan Gum HA-B[E], High Acyl, supplier CP Kelco |  |  |  |
| Locus Bean Gum 246, supplier Dupont |  |  |  |
| Tara Gum, Aglumix 01, supplier Silva Team) |  |  |  |
| Topcithin S (sunflower lecithin) - supplier, Cargill |  |  | 0.12 |
| Natural Flavors |  |  |  |
| High Oleic Sunflower Oil - supplier Cargill | 8.5 | 8.5 | 8.5 |
| TriSodium Citrate | 0.75 | 0.75 | 0.75 |
| 50% liquid solution of Dipotassium Phosphate (as is) | 2.5 | 2.5 | 2.5 |
| Sodium Bicarbonate, Anhydrous |  |  |  |
| Pea Protein (Farbest BLS) | 1 | 0.5 | 1 |
| Hydrolyzed Oat powder, ref 30753802, supplied by Kerry Ingredients |  |  |  |
| Preparation procedure | 3 | 3 | 3 |
| Coffee Abuse Test | Fail | Fail | Fail |
| pH | 8.1 | 8.07 | 8.09 |
| Dx (90) (μm) | 1.51 | 1.97 | 2.05 |
| D [4,3] (μm) | 1.82 | 1.11 | 0.936 |
| D [3,2] (μm) | 0.625 | 0.811 | 0.565 |
| Mode Count | 1 | 1 | 1 |
| Visual Observation (24 Hr) | Separation w/in 24 hrs of processing | Separation w/in 24 hrs of processing | Separation w/in 24 hrs of processing |
| Visual Observation (7-14 Days) | Completely Separated | Completely Separated | Completely Separated |
| Visual Observation (30+ days) |  |  |  |

|  | Example 22C | Example 23C |
|---|---|---|
| Water | 63.35 | 62.920 |
| Cane Sugar | 25 | 25.000 |
| Sea Salt |  | 0.050 |
| Gum *Acacia* Senegal (Arabic), Spray Dry, supplier TIC GUMS | 3 |  |
| Gum *Acacia* Seyal, supplier Agropur |  | 3.500 |
| Gum Tragacanth T/3, supplier AEP Colloids |  |  |
| Guar Gum 8/22, supplier Tic Gums |  |  |
| Xanthan Gum 7180, supplier Agropur | 0.03 | 0.030 |
| Gellan Gum HA-B[E], High Acyl, supplier CP Kelco |  |  |
| Locus Bean Gum 246, supplier Dupont |  |  |
| Tara Gum, Aglumix 01, supplier Silva Team) |  |  |
| Topcithin S (sunflower lecithin) - supplier, Cargill | 0.12 |  |
| Natural Flavors |  |  |
| High Oleic Sunflower Oil - supplier Cargill | 8.5 | 8.500 |
| TriSodium Citrate |  |  |
| 50% liquid solution of Dipotassium Phosphate (as is) |  |  |
| Sodium Bicarbonate, Anhydrous |  |  |
| Pea Protein (Farbest BLS) |  |  |
| Hydrolyzed Oat powder, ref 30753802, supplied by Kerry Ingredients |  |  |
| Preparation procedure | 1 | 1 |
| Coffee Abuse Test | Pass; more oiling off observed on the surface | Fail |
| pH | 5.16 | 5.25 |
| Dx (90) (μm) | 7.23 | 57.6 |
| D [4,3] (μm) | 2.81 | 29.8 |
| D [3,2] (μm) | 1.13 | 4.84 |
| Mode Count | 2 | 2 |
| Visual Observation (24 Hr) | Uniform appearance 24 hours post process. | separated right off the processor; darker yellow color |
| Visual Observation (7-14 Days) | Creaming observed within 7 days. | Completely Separated |
| Visual Observation (30+ days) |  |  |

The invention claimed is:

1. A liquid dairy-free beverage creamer or whitener composition comprising:
   water;
   15% to 35% by weight of at least one sugar ingredient;
   7% to 10% by weight of at least one vegetable oil;
   2.00% to 4.00% by weight of acacia senegal gum;
   0.01% to 0.05% by weight of xanthan gum; and
   optionally a flavor modification agent,
   the total being 100% by weight,
   wherein the composition is substantially free of sunflower lecithin and of nut component(s) and has a pH of from 4.0 to 6.0.

2. A composition according to claim 1, further comprising a cereal component.

3. A composition according to claim 2, wherein the cereal component is an oat component.

4. A composition according to claim 1, wherein the xanthan gum is present in an amount from 0.02% to 0.04% by weight.

5. A composition according to claim 1, wherein the vegetable oil is selected form the group consisting of palm oil, palm kernel oil, soybean oil, canola oil, safflower oil, sunflower oil, coconut oil, and mixtures thereof.

6. A composition according to claim 1, being substantially free of non-grain protein.

7. A composition according to claim 1, being substantially free of protein.

8. A composition according to claim 1, being substantially free of a lecithin.

9. A composition according to claim 1, being substantially free of buffering agent(s).

10. A composition according to claim 1, having an emulsion of vegetable oil droplets in water.

11. A composition according to claim 10, wherein the droplets have a volume-mean size of from 0.5 to 1.8 μm.

12. A composition according to claim 1, being a dairy-free, plant-based composition.

13. A composition according to claim 1, wherein the composition is contained in a sealed container.

14. A composition according to claim 13, wherein the sealed container has a volume of up to 25 mL.

15. A liquid dairy-free beverage creamer or whitener emulsion comprising:
    water;
    15% to 35% by weight of at least one sugar ingredient;
    7% to 10% by weight of at least one vegetable oil;
    2.00% to 4.00% by weight of acacia senegal gum;
    0.01% to 0.05% by weight of xanthan gum; and
    optionally a flavor modification agent,
    the total being 100% by weight,
    wherein the composition is substantially free of sunflower lecithin and of nut component(s) and has a pH of from 4.0 to 6.0; and
    wherein the emulsion droplets have a volume-mean size of from 0.5 to 1.8 μm.

16. A composition according to claim 15, further comprising a cereal component.

17. A composition according to claim 16, wherein the cereal component is an oat component.

18. A composition according to claim 15, wherein the xanthan gum is present in an amount from 0.02% to 0.04% by weight.

19. A composition according to claim 15, wherein the vegetable oil is selected form the group consisting of palm oil, palm kernel oil, soybean oil, canola oil, safflower oil, sunflower oil, coconut oil, and mixtures thereof.

20. A composition according to claim 15, being substantially free of non-grain protein.

21. A composition according to claim 15, being substantially free of protein.

22. A composition according to claim 15, being substantially free of a lecithin.

23. A composition according to claim 15, being substantially free of buffering agent(s).

24. A composition according to claim 15, being a dairy-free, plant-based composition.

25. A composition according to claim 15, wherein the composition is contained in a sealed container.

26. A composition according to claim 25, wherein the sealed container has a volume of up to 25 mL.

* * * * *